United States Patent
Partap Singh Rana et al.

(10) Patent No.: US 10,310,985 B2
(45) Date of Patent: Jun. 4, 2019

(54) SYSTEMS AND METHODS FOR ACCESSING AND MANAGING A COMPUTING SYSTEM MEMORY

(71) Applicant: ATI Technologies ULC, Markham (CA)

(72) Inventors: Dhirendra Partap Singh Rana, Richmond Hill (CA); Conrad Lai, Richmond Hill (CA); Jeffrey G. Cheng, Toronto (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 15/633,083

(22) Filed: Jun. 26, 2017

(65) Prior Publication Data

US 2018/0373641 A1 Dec. 27, 2018

(51) Int. Cl.
*G06F 12/02* (2006.01)
*G06F 12/10* (2016.01)
*G06F 12/1072* (2016.01)

(52) U.S. Cl.
CPC ............. *G06F 12/10* (2013.01); *G06F 12/02* (2013.01); *G06F 12/0292* (2013.01); *G06F 12/1072* (2013.01)

(58) Field of Classification Search
CPC .................................................. G06F 12/0292
See application file for complete search history.

(56) References Cited

U.S. PATENT DOCUMENTS

| | | | |
|---|---|---|---|
| 6,282,614 B1 | 8/2001 | Musoll | |
| 7,669,011 B2 | 2/2010 | Conway | |
| 8,499,066 B1 | 7/2013 | Zhang et al. | |
| 10,067,709 B2 | 9/2018 | Piga et al. | |
| 10,089,014 B2 | 10/2018 | Uppal et al. | |
| 2005/0081181 A1 | 4/2005 | Brokenshire et al. | |
| 2009/0150624 A1 | 6/2009 | Resnick | |
| 2009/0222625 A1 | 9/2009 | Ghosh et al. | |
| 2009/0271596 A1 | 10/2009 | Barsness et al. | |

(Continued)

OTHER PUBLICATIONS

Frigo, et al., "FFTW: An Adaptive Software Architecture for the FFT", Proceedings of the 1998 IEEE International Conference on Acoustics, Speech and Signal Processing, May 15, 2998, 4 pages.
(Continued)

*Primary Examiner* — Edward J Dudek, Jr.
(74) *Attorney, Agent, or Firm* — Meyertons Hood Kivlin Kowert and Goetzel PC; Rory D. Rankin

(57) ABSTRACT

Systems, apparatuses, and methods for accessing and managing memories are disclosed herein. In one embodiment, a system includes at least first and second processors and first and second memories. The first processor maintains a request log with entries identifying requests that have been made to pages stored in the second memory. The first processor generates an indication for the second processor to process the request log when the number of entries in the request log reaches a programmable threshold. The second processor dynamically adjusts the programmable threshold based on one or more first conditions. The second processor also processes the request log responsive to detecting the indication. Additionally, the second processor determines whether to migrate pages from the second memory to the first memory based on one or more second conditions.

14 Claims, 12 Drawing Sheets

(56) References Cited

U.S. PATENT DOCUMENTS

| | | |
|---|---|---|
| 2010/0250856 A1 | 9/2010 | Owen et al. |
| 2012/0023280 A1 | 1/2012 | Lais et al. |
| 2012/0023302 A1 | 1/2012 | Arndt et al. |
| 2012/0059983 A1 | 3/2012 | Nellans et al. |
| 2012/0233486 A1 | 9/2012 | Phull et al. |
| 2013/0036266 A1 | 2/2013 | Naganuma et al. |
| 2014/0281110 A1* | 9/2014 | Duluk, Jr. ............. G06F 13/404 710/313 |
| 2014/0281299 A1 | 9/2014 | Duluk, Jr. et al. |
| 2014/0281365 A1 | 9/2014 | Mashey et al. |
| 2014/0365738 A1 | 12/2014 | Hod et al. |
| 2015/0006785 A1 | 1/2015 | Jayaraman et al. |
| 2015/0052287 A1 | 2/2015 | Venkatasubramanian et al. |
| 2015/0088805 A1 | 3/2015 | Kakarla et al. |
| 2015/0309940 A1* | 10/2015 | Kumar ................ G06F 12/1009 345/506 |
| 2016/0117498 A1* | 4/2016 | Saxena ................ G06F 21/445 726/23 |
| 2016/0124852 A1* | 5/2016 | Shachar ................. G06F 12/08 345/505 |
| 2016/0232640 A1* | 8/2016 | Zhao ......................... G06T 1/20 |
| 2016/0378655 A1 | 12/2016 | Blagodurov et al. |
| 2016/0378674 A1 | 12/2016 | Cheng et al. |
| 2017/0004647 A1* | 1/2017 | Grossman ................ G06T 1/60 |
| 2017/0083240 A1* | 3/2017 | Rogers .................... G06F 3/065 |
| 2017/0262216 A1 | 9/2017 | Polkovnikov et al. |
| 2018/0074715 A1 | 3/2018 | Farmahini-Farahani et al. |
| 2018/0307414 A1 | 10/2018 | Smith et al. |

OTHER PUBLICATIONS

Volos, et al., "BuMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awasthi, et al., "Prediction Based DRAM Row-Buffer Management in the Many-Core Era", International Conference on Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

Qiao et al., "Fast Bloom Filters and Their Generalization", IEEE Transactions on Parallel and Distributed Systems, Jan. 2014, pp. 93-103, vol. 25, Issue 1, IEEE Computer Society, Washington, D.C., USA.

Breternitz et al., "A Segmented Bloom Filter Algorithm for Efficient Predictors", Proceedings of the 2008 20th International Symposium on Computer Architecture and High Performance Computing, Oct. 29, 2008, pp. 123-130, IEEE Computer Society, Washington, D.C., USA.

Hwang, Kai, "Advanced Computer Architecture: Parallelism, Scalability, Programmability", 2011, 2nd Ed., pp. 17-29, 52-55, McGraw-Hill.

Patterson et al., "Computer Organization and Design: The Hardware/Software Interface", 2014, 5th Ed, pp. 509-510, 519-520, 531-533, Elsevier.

Mccreary et al., "Automatic Determination of Grain Size for Efficient Parallel Processing", Sep. 1989, pp. 1073-1078, vol. 32, Issue 9.

Maheshwari, Piyush, "Improving granularity and locality of data in multiprocessor execution of functional programs", Parallel Computing, Dec. 1996, pp. 1359-1372, vol. 22, Issue 10, Elsevier B.V.

Kruatrachue et al., "Grain Size Determination for Parallel Processing", IEEE Software, Jan. 1988, pp. 23-32, vol. 5, Issue 1, IEEE Computer Society Press, os Alamitos, CA, USA.

Gutierrez, Anthony Thomas, U.S. Appl. No. 15/649,312, entitled "Predicting Page Migration Granularity for Heterogeneous Memory Systems", filed Jul. 13, 2017, 25 pages.

* cited by examiner

SYSTEMS AND METHODS FOR ACCESSING AND MANAGING A COMPUTING SYSTEM MEMORY

BACKGROUND

Description of the Related Art

Many computing devices use a virtual memory technique for handling data accesses by software programs. A virtual memory page-translation mechanism enables system software to create separate address spaces for each process or application. For graphics applications, each surface can have a separate address space. These address spaces are known as virtual address spaces. The system software uses the paging mechanism to selectively map individual pages of physical memory into the virtual address space using a set of hierarchical address-translation tables known collectively as page tables. Virtual memory can be implemented with any processor, including, but not limited to, a central processing unit (CPU), a graphics processing unit (GPU), and an accelerated processing unit (APU).

When data is accessed by a program, a block of memory of a given size (e.g., 4 kilobytes (KB)) that includes the data, called a "page" of memory, is copied from backing storage (e.g., a disk drive or semiconductor memory) to an available physical location in a main memory in the computing device. Some systems have multiple different page sizes stored in memory. Rather than having programs manage the physical locations of the pages, a memory management unit in the computing device manages the physical locations of the pages. Instead of using addresses based on the physical locations of pages (or "physical addresses") for accessing memory, the programs access memory using virtual addresses in virtual address spaces. From a program's perspective, virtual addresses indicate the actual physical addresses (i.e., physical locations) where data is stored within the pages in memory and hence memory accesses are made by programs using the virtual addresses. However, the virtual addresses do not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs. To perform the above-described translations, the memory management unit uses page tables in memory that include a set of translations from virtual addresses to physical addresses for pages stored in the memory.

Some computing systems include multiple different memory devices for storing data accessed by the processor(s). For example, a processor can be coupled to a first memory and a second memory, with the processor having lower latency access to the first memory as compared to the second memory. Data accessed by the processor is stored in the first memory until the first memory runs out of space. Then, when the first memory is fully occupied, data accessed by the processor is stored in the second memory. However, some of the data in the first memory becomes stale and is accessed infrequently compared to data stored in the second memory. Migrating frequently accessed data from the second memory to the first memory can help improve the performance of the processor.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
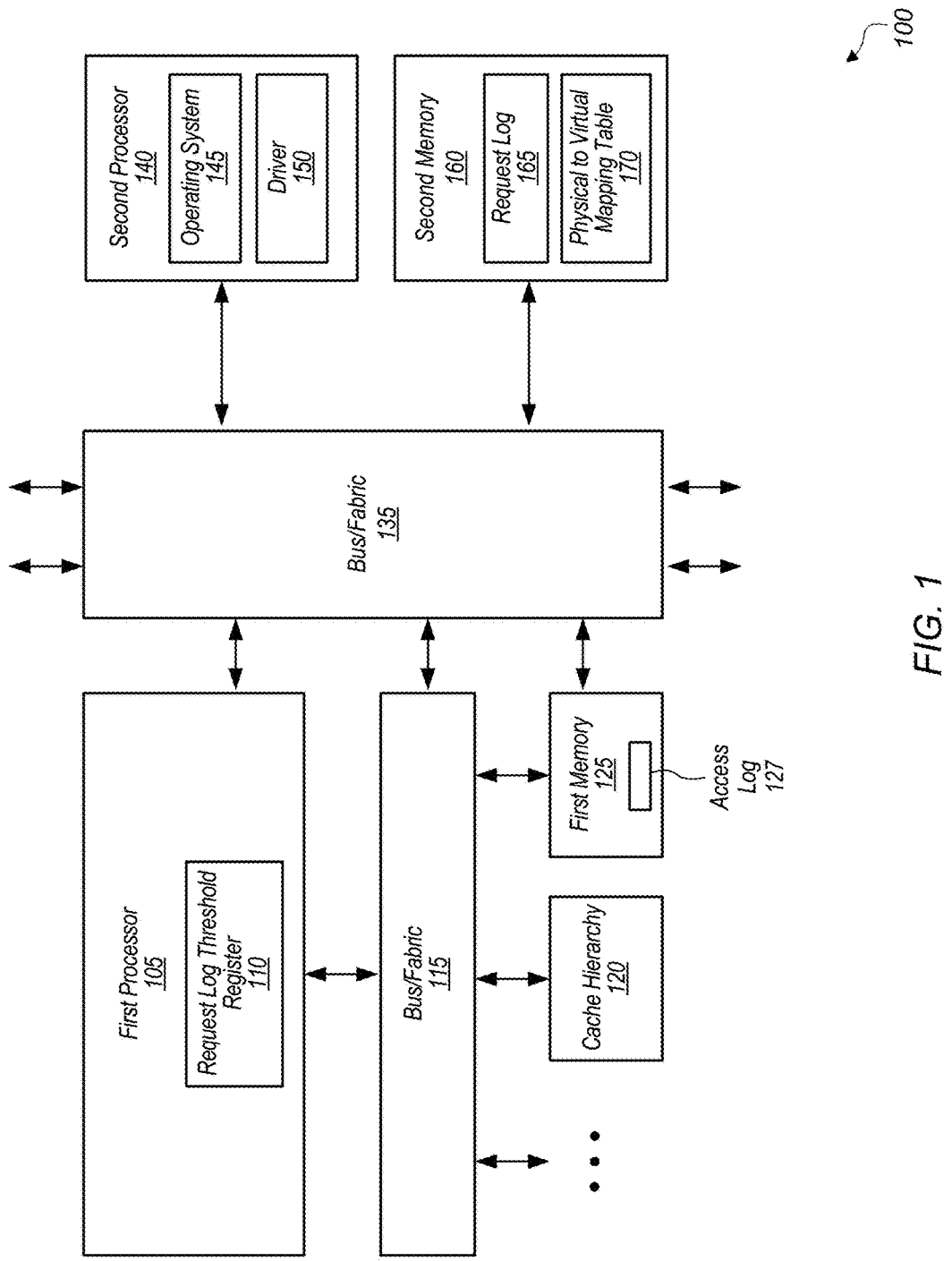
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for accessing and managing memories are disclosed herein. In one embodiment, a system includes at least first and second processors and first and second memories. In one embodiment, the first processor can perform accesses to the first memory with lower latency than accesses to the second memory. The first processor maintains a request log with entries identifying requests that have been made to pages stored in the second memory. The first processor generates an indication for the second processor to process the request log when the number of entries in the request log reaches a first threshold. The second processor dynamically adjusts the first threshold based on one or more first conditions. The second processor also processes the request log responsive to detecting the indication. Additionally, the second processor determines whether to migrate pages from the second memory to the first memory based on one or more second conditions. In one embodiment, the first processor is a graphics processing unit (GPU), the second processor is a central processing unit (CPU), and the indication is an interrupt.

In one embodiment, the one or more first conditions for dynamically adjusting the first threshold include determining an indication generation rate is not within a given range. In this embodiment, the second processor increases the first threshold responsive to determining the indication generation rate is greater than the given range. Additionally, the second processor decreases the first threshold responsive to determining the indication generation rate is less than the given range. In one embodiment, the given range is calculated based on generating one indication per graphics frame. For example, the given range can be centered on one indication per graphics frame.

In one embodiment, processing the request log involves retrieving a physical address of a physical page identified in an entry in the request log, determining a virtual page to which the physical page belongs, updating an access count associated with the virtual page, and migrating a plurality of physical pages, of the virtual page, from the second memory to the first memory responsive to determining the access count is greater than a second threshold. In this embodiment, the second processor performs a reverse lookup of a reverse mapping table to retrieve a virtual address of the virtual page which maps to the physical page identified in the entry of the request log. The second processor also updates page table entries for the plurality of physical pages which are migrated. In other embodiments, the second processor can perform one or more other steps when processing the request log and/or migrating pages from the second memory to the first memory.

Referring now to FIG. 1, a block diagram of one embodiment of a computing system 100 is shown. In one embodiment, computing system 100 includes a first processor 105, bus/fabric 115, cache hierarchy 120, first memory 125, bus/fabric 135, second processor 140, and second memory 160. System 100 can also include other components not shown in FIG. 1 to avoid obscuring the figure. In one embodiment, first processor 105 is a graphics processing unit (GPU) and second processor 140 is a central processing unit (CPU). In other embodiments, first processor 105 and/or second processor 140 can be implemented using other types of processing units (e.g., application specific integrated circuit (ASIC), field programmable gate array (FPGA), digital signal processor (DSP)).

In various embodiments, first processor 105 includes at least one or more compute units (not shown), one or more caches (not shown), and a plurality of registers (not shown). In one embodiment, the plurality of registers of first processor 105 includes at least request log threshold register 110. Request log threshold register 110 stores a threshold value which indicates when first processor 105 will generate an interrupt for second processor 140. First processor 105 stores an entry in request log 165 for each access to a physical page stored in second memory 160. As used herein, the term "page" is defined as a fixed-length contiguous block of virtual memory. A "page" is also defined as a unit of data utilized for memory management by system 100. The size of a page can vary from embodiment to embodiment, and multiple different page sizes can be utilized in a single embodiment. It should be understood that the term "page" is intended to represent any size of memory region.

In one embodiment, request log 165 is stored in second memory 160. In other embodiments, request log 165 is stored in other locations. In one embodiment, request log 165 is implemented as a ring buffer. In this embodiment, a write pointer stores the index of the last request log entry written by first processor 105. A read pointer stores the index of the last request log entry read by driver 150. Driver 150 increments the read pointer after it processes an entry. All entries are processed when the read pointer equals the write pointer. In other embodiments, request log 165 can be implemented using other types of structures.

When an access is made by first processor 105 to a page in second memory 160, first processor 105 stores the physical address of the page in a corresponding entry in request log 165. Additionally, first processor 105 tracks access to pages in first memory 125 in access log 127. In one embodiment, first processor 105 is configured to compare the number of entries in request log 165 to request log threshold register 110. If the number of requests is greater than or equal to the threshold in register 110, then first processor 105 generates an interrupt for second processor 140 to process request log 165. Otherwise, if the number of requests is less than the threshold, then first processor 105 waits to generate an interrupt.

When an interrupt is generated by first processor 105, an interrupt handler of operating system 145 of second processor 140 detects the interrupt. In one embodiment, operating system 145 utilizes driver 150 to process the request log 165 in response to detecting the interrupt. In one embodiment, driver 150 tracks the number of accesses to virtual pages in second memory 160 so as to migrate any frequently-accessed virtual pages from second memory 160 to first memory 125. It is noted that a "virtual page" is defined as a page of virtual memory, with the size of the virtual page varying according to the embodiment. In one embodiment, each virtual page includes a plurality of physical pages. For example, in this embodiment, a virtual page is 64 kilobytes (KB) and a physical page is 4 KB. In other embodiments, a virtual page and/or a physical page can be other sizes.

Additionally, driver 150 also monitors access log 127 to identify potential eviction candidates among the pages of first memory 125. In one embodiment, driver 150 queries access log 127 to determine how often each page of first memory 125 is being accessed by first processor 105. In one embodiment, access log 127 is stored in first memory 125. In other embodiments, access log 127 is stored in other locations. In one embodiment, driver 150 also determines the priority of each page based on a priority of the process or surface to which the page belongs. Based on the access log 127 and the priority of the page, driver 150 generates and maintains a list of eviction candidates for eviction from first memory 125 to second memory 160. When driver 150 migrates pages from second memory 160 to first memory 125, driver 150 utilizes the eviction candidate list to determine which pages to evict from first memory 125 to second memory 160 to make room for the pages being migrated.

In one embodiment, driver 150 is configured to program the threshold value in request log threshold register 110. In one embodiment, the goal of driver 150 is to program the threshold value to prevent the information in request log 165 from becoming stale while also trying to minimize the number of interrupts that are generated. More frequent request log interrupts allow second processor 140 to react faster, but this can be balanced against having too many interrupts affecting system performance. In one embodiment, the goal of driver 150 is to dynamically adjust the threshold value to balance these multiple requirements.

Accordingly, in one embodiment, rather than utilizing a fixed threshold value, driver 150 dynamically adjusts request log threshold register 110 based on one or more conditions. In one embodiment, the one or more conditions include determining that a rate of interrupt generation is not within a desired range. In this embodiment, driver 150 keeps a history of the elapsed time between interrupts. For example, a timestamp is taken when each interrupt occurs. In one embodiment, the timestamp is a snapshot of a hardware counter that increments at a fixed rate. The elapsed time is calculated from the difference between timestamps and the rate at which the counter increments. In one embodiment, an average is taken of the elapsed times of the last X interrupts, wherein the value of X can vary. In one embodiment, the average is weighted to prioritize the more recent interrupts.

In one embodiment, the desired rate of interrupts is one interrupt per graphics frame, so that driver 150 has an opportunity to migrate memory pages before the next frame. In this embodiment, driver 150 attempts to keep the rate of interrupts within a given range around one interrupt per each graphics frame. Accordingly, a first condition for dynamically adjusting the request log threshold register 110 is determining that the rate of interrupts is substantially less than one per graphics frame. A second condition for dynamically adjusting the request log threshold register 110 is determining that the rate of interrupts is substantially greater than one per graphics frame.

In one embodiment, first processor 105, bus/fabric 115, cache hierarchy 120, and first memory 125 are integrated together on a single semiconductor die. This can enable first processor to access data stored in cache hierarchy 120 and first memory 125 in an efficient manner. In this embodiment, second memory 160 is located off of the die containing first processor 105. In other embodiments, other components of system 100 can also be included on the same die as first processor 105, bus/fabric 115, cache hierarchy 120, and first memory 125. Bus/fabric 115 and bus/fabric 135 are representative of any type of bus or communication fabric which can be utilized for providing connections between components. For example, bus/fabric 115 and/or bus/fabric 135 can include an interface such as a peripheral component interface (PCI) Express Interface. Additionally, bus/fabric 135 can be coupled to a peripheral bus such as a PCI bus, to which various peripheral components are directly or indirectly coupled. In other embodiments, other circuitry can be used to link together the various hardware components. In one embodiment, bus/fabric 115 is on the same die as first processor 105 and bus/fabric 135 is external to this die. Bus/fabric 115 can also be coupled to any type and number of other components. Cache hierarchy 120 includes any number and organization of cache levels. In one embodiment, cache hierarchy 120 includes multiple level one (L1) caches and a level two (L2) cache. In other embodiments, cache hierarchy 120 can be organized in other suitable manners.

First memory 125 and second memory 160 can be implemented utilizing any type of memory. In one embodiment, first memory 125 and second memory 160 are implemented using random access memory (RAM). The RAM implemented can be static RAM (SRAM), dynamic RAM (DRAM), Resistive RAM (ReRAM), Phase Change RAM (PCRAM), or any other volatile or non-volatile RAM. The type of DRAM that is used includes (but is not limited to) double data rate (DDR) DRAM, DDR2 DRAM, DDR3 DRAM, and so forth. In one embodiment, first memory 125 is implemented with high-bandwidth memory (HBM). It is noted that throughout this disclosure, the terms "first memory" and "local memory" can be used interchangeably. Also, the terms "second memory" and "system memory" can be used interchangeably.

In one embodiment, pages targeted by the threads running on first processor 105 are retrieved from backing storage and are initially stored in first memory 125 for low latency access by first processor 105. When first memory 125 is full, pages are stored in second memory 160. When it is determined that pages in second memory 160 are being accessed frequently and/or belong to high priority surfaces, these pages can be migrated to first memory 125. To make room for these pages being migrated, infrequently accessed pages and/or pages with a low priority can be evicted from first memory 125 to second memory 160. In one embodiment, determining which pages to migrate from second memory 160 to first memory 125 is based at least in part on processing of the entries in request log 165. The entries of request log 165 are processed to determine which pages of second memory 160 are being accessed frequently by first processor 105.

In one embodiment, pages in first memory 125 are of a first size and pages in second memory 160 are of a second size, wherein the first size is different from the second size. In one embodiment, the first size is 64 KB and the second size is 4 KB. In other embodiments, the first size and/or the second size can be other values. When the first size is 64 KB and the second size is 4 KB and a given 4 KB page in second memory 160 is migrated to first memory 125, the adjacent 4 KB pages of the given 4 KB page can also be migrated to first memory 125. In other words, the entire 64 KB virtual page, which contains the given 4 KB page, is migrated from second memory 160 to first memory 125. In one embodiment, driver 150 utilizes physical to virtual mapping table 170 to identify the virtual address of a given physical page selected for migration. Then, driver 150 utilizes the virtual address to lookup the regular page tables (not shown) to find the other 4 KB physical pages of the 64 KB virtual page.

When driver 150 decides to migrate a page from second memory 160 to first memory 125, driver 150 has the physical address of the page from request log 165. However, when driver 150 updates the page tables after migrating the page, driver 150 will utilize the virtual address of the page to find and update the appropriate page table entries. In one embodiment, driver 150 maintains a physical to virtual mapping table 170 which allows driver 150 to determine the virtual address of a given physical page in a time efficient manner. Driver 150 retrieves the physical page of the given page from request log 165 and then performs a reverse lookup to determine the virtual page of the given page. Then, driver 150 can locate other physical pages of this same virtual page and migrate these other pages with the given page. After migrating the pages, driver 150 updates the page table entries for these migrated pages with the new physical addresses in first memory 125.

In various embodiments, computing system 100 can be a computer, laptop, mobile device, server or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 2. Additionally, in other embodiments, computing system 100 can be structured in other ways than shown in FIG. 1.

Figure 2:
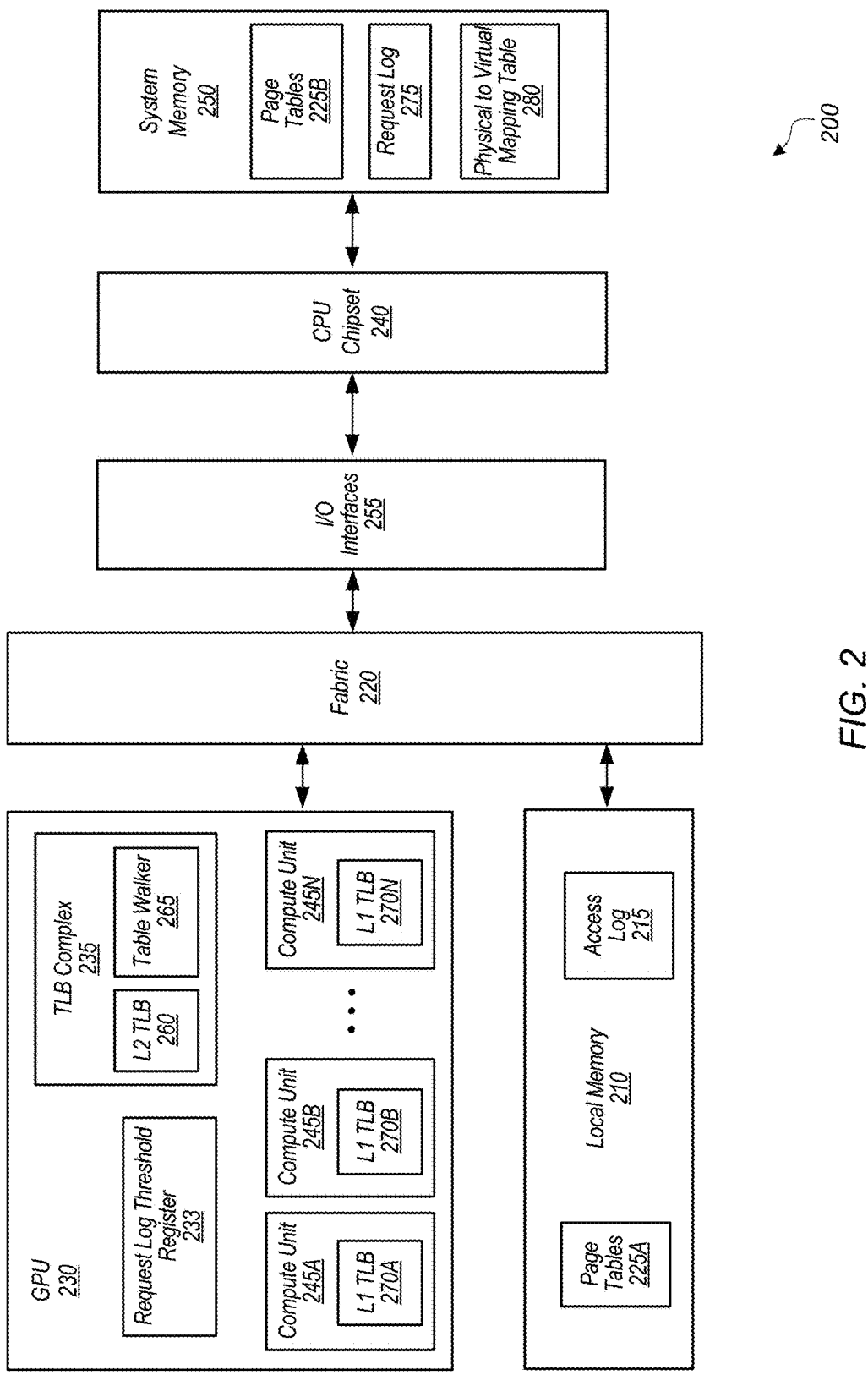
FIG. 2 is a block diagram of another embodiment of a computing system.

Turning now to FIG. 2, a block diagram of another embodiment of a computing system 200 is shown. It is noted that computing system 200 is an alternate version of computing system 100 (of FIG. 1) which can be utilized for implementing the methods and mechanisms described herein. For example, in one embodiment, GPU 230 is intended to represent first processor 105 while CPU chipset 240 is intended to represent second processor 140. Additionally, it should be understood that other types of computing systems with different structures and/or containing other components can be utilized to implement the various methods and mechanisms described herein.

In one embodiment, computing system 200 includes a system memory 250, input/output (I/O) interfaces 255, fabric 220, graphics processing unit (GPU) 230, local memory 210, and CPU Chipset 240. System 200 can also include other components not shown in FIG. 2 to avoid obscuring the figure. In another embodiment, GPU 230 can be another type of processing unit (e.g., ASIC, FPGA, DSP).

GPU 230 includes at least request log threshold register 233, translation lookaside buffer (TLB) complex 235, and compute units 245A-N which are representative of any number and type of compute units that are used for graphics or general-purpose processing. Each compute unit 245A-N includes any number of execution units, with the number of execution units varying from embodiment to embodiment. GPU 230 is coupled to local memory 210 via fabric 220. In one embodiment, local memory 210 is implemented using high-bandwidth memory (HBM). In one embodiment, local memory 210 stores access log 215 for tracking accesses to pages in local memory 210.

In one embodiment, GPU 230 is configured to execute graphics pipeline operations such as draw commands, pixel operations, geometric computations, and other operations for rendering an image to a display. In another embodiment, GPU 230 is configured to execute operations unrelated to graphics. In a further embodiment, GPU 230 is configured to execute both graphics operations and non-graphics related operations.

In one embodiment, GPU 230 uses TLBs to store mappings of virtual addresses to physical addresses for the virtual addresses that are allocated to different processes executing on GPU 230. These TLBs are shown as L1 TLBs 270A-N in compute units 245A-N, respectively, and L2 TLB 260 in TLB complex 235. TLB complex 235 also includes table walker 265. Generally speaking, a memory management unit can include one or more TLBs, table walking logic, fault handlers, and other circuitry depending on the implementation. In some embodiments, different TLBs can be implemented within GPU 230 for instructions and data. For example, a relatively small and fast L1 TLB is backed up by a larger L2 TLB that requires more cycles to perform a lookup. The lookup performed by an L2 TLB is relatively fast compared to a table walk to page tables 225A-B. Depending on the embodiment, page tables 225A-B can be located in local memory 210, system memory 250, or portions of page tables 225A-B can be located in local memory 210 and system memory 250. Some embodiments of TLB complex 235 include an instruction TLB (ITLB), a level one data TLB (L1 DTLB), and a level two data TLB (L2 DTLB). Other embodiments of TLB complex 235 can include other configurations and/or levels of TLBs.

In one embodiment, an address translation for a load instruction or store instruction in GPU 230 is performed by posting a request for a virtual address translation to the L1 TLB. The L1 TLB returns the physical address if the virtual address is found in an entry of the L1 TLB. If the request for the virtual address translation misses in the L1 TLB, then the request is posted to the L2 TLB. If the request for the virtual address translation misses in the L2 TLB, then a page table walk is performed for the request. A page table walk can result in one or more lookups to the page table structure (i.e., page tables 225A-B).

I/O interfaces 255 are coupled to fabric 220, and I/O interfaces 255 are representative of any number and type of interfaces (e.g., PCI bus, PCI-Extended (PCI-X), PCIE (PCI Express) bus, gigabit Ethernet (GBE) bus, universal serial bus (USB)). GPU 230 is coupled to system memory 250, which includes one or more memory modules. Each of the memory modules includes one or more memory devices mounted thereon. In some embodiments, system memory 250 includes one or more memory devices mounted on a motherboard or other carrier upon which GPU 230 and/or other components are also mounted. In one embodiment, system memory 250 stores request log 275 with entries identifying system memory pages accessed by GPU 230, and system memory 250 also stores physical to virtual mapping table 280 for performing reverse lookups of physical addresses.

In various embodiments, computing system 200 can be a computer, laptop, mobile device, server or any of various other types of computing systems or devices. It is noted that the number of components of computing system 200 and/or GPU 230 can vary from embodiment to embodiment. There can be more or fewer of each component/subcomponent than the number shown in FIG. 2. It is also noted that computing system 200 and/or GPU 230 can include other components not shown in FIG. 2. For example, in another embodiment, GPU 230 can represent a multicore processor. Additionally, in other embodiments, computing system 200 and GPU 230 can be structured in other ways than shown in FIG. 2.

Figure 3:
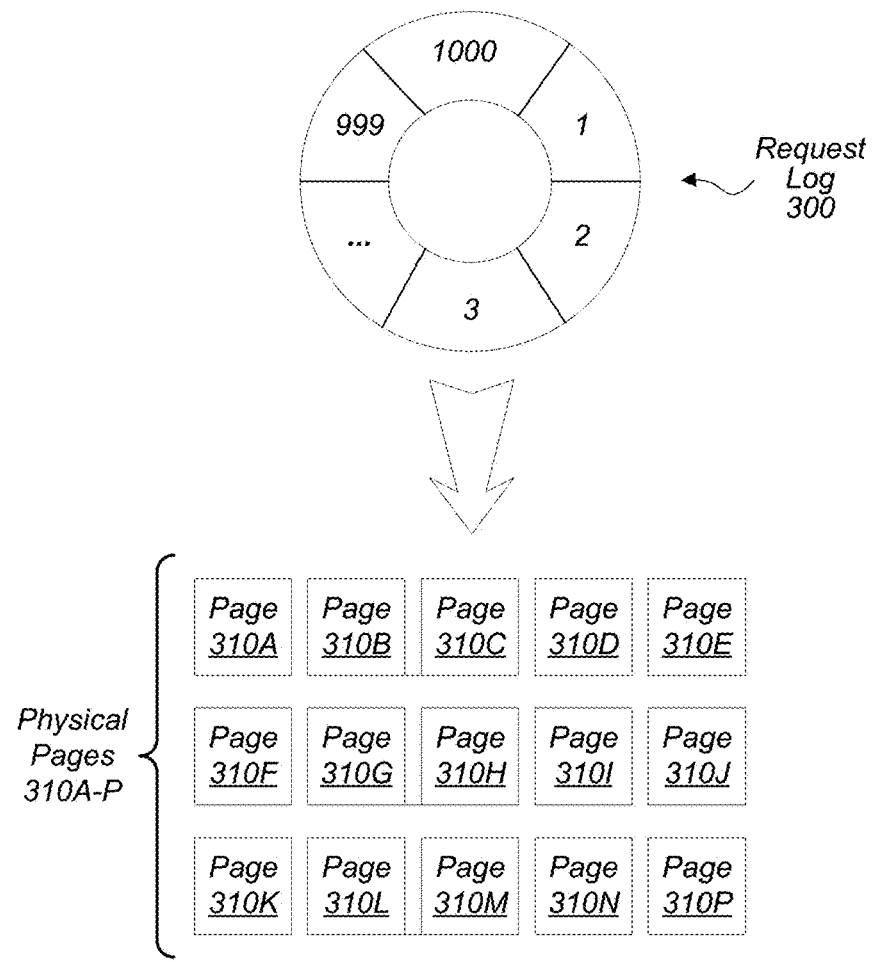
FIG. 3 is a block diagram of one embodiment of a request log ring buffer.

Referring now to FIG. 3, a block diagram of one embodiment of a request log 300 is shown. In one embodiment, a system maintains a request log 300 to track requests to pages of system memory. When a request targeting system memory is generated, information about the request is stored in request log 300. In one embodiment, request log 300 is implemented as a ring buffer. As used herein, the term "ring buffer" is defined as a data structure that uses a single, fixed-size buffer as if it were connected end-to-end. A "ring buffer" also uses separate indices for inserting and removing data. The size of the ring buffer can vary from embodiment to embodiment.

In one embodiment, request log 300 stores entries identifying physical pages 310A-N. Physical pages 310A-P are representative of any number of physical pages that have been accessed by a first processor, with these physical pages identified in entries stored in request log 300. The number of physical pages 310A-P identified in entries in request log 300 can vary depending on the rate of requests and how recently request log 300 was processed.

Figure 4:
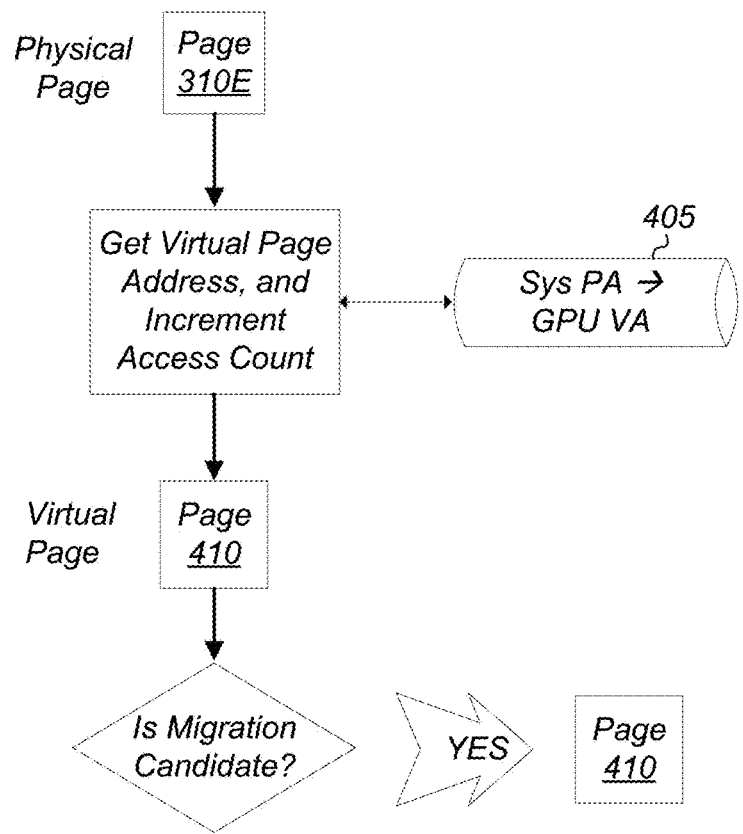
FIG. 4 is a block diagram of one embodiment of determining whether a virtual page is a migration candidate.

Turning now to FIG. 4, a block diagram of one embodiment of determining whether a virtual page is a migration candidate is shown. Physical page 310E is representative of a physical page stored in system memory that has been accessed by a GPU (e.g., GPU 230 of FIG. 2) and identified in an entry in a request log (e.g., request log 165 of FIG. 1). In one embodiment, when a driver (e.g., driver 150 of FIG. 1) processes the request log and encounters the entry for page 310E, the driver retrieves, from physical-to-virtual address mapping table 405, the virtual address of the virtual page which contains page 310E. It is assumed for the purposes of this discussion that the virtual address retrieved from table 405 identifies virtual page 410 as the virtual page which contains the physical page 310E. Then, the driver increments an access count for virtual page 410. In one embodiment, table 405 is maintained by the driver.

After incrementing the access count for virtual page 410, the driver determines if virtual page 410 is a migration candidate. In one embodiment, the driver determines if virtual page 410 is a migration candidate based on the number of times virtual page 410 has been accessed as indicated by the access count. In other embodiments, the driver determines if virtual page 410 is a migration candidate based on one or more additional factors (e.g., the priority of the surface).

Figure 5:
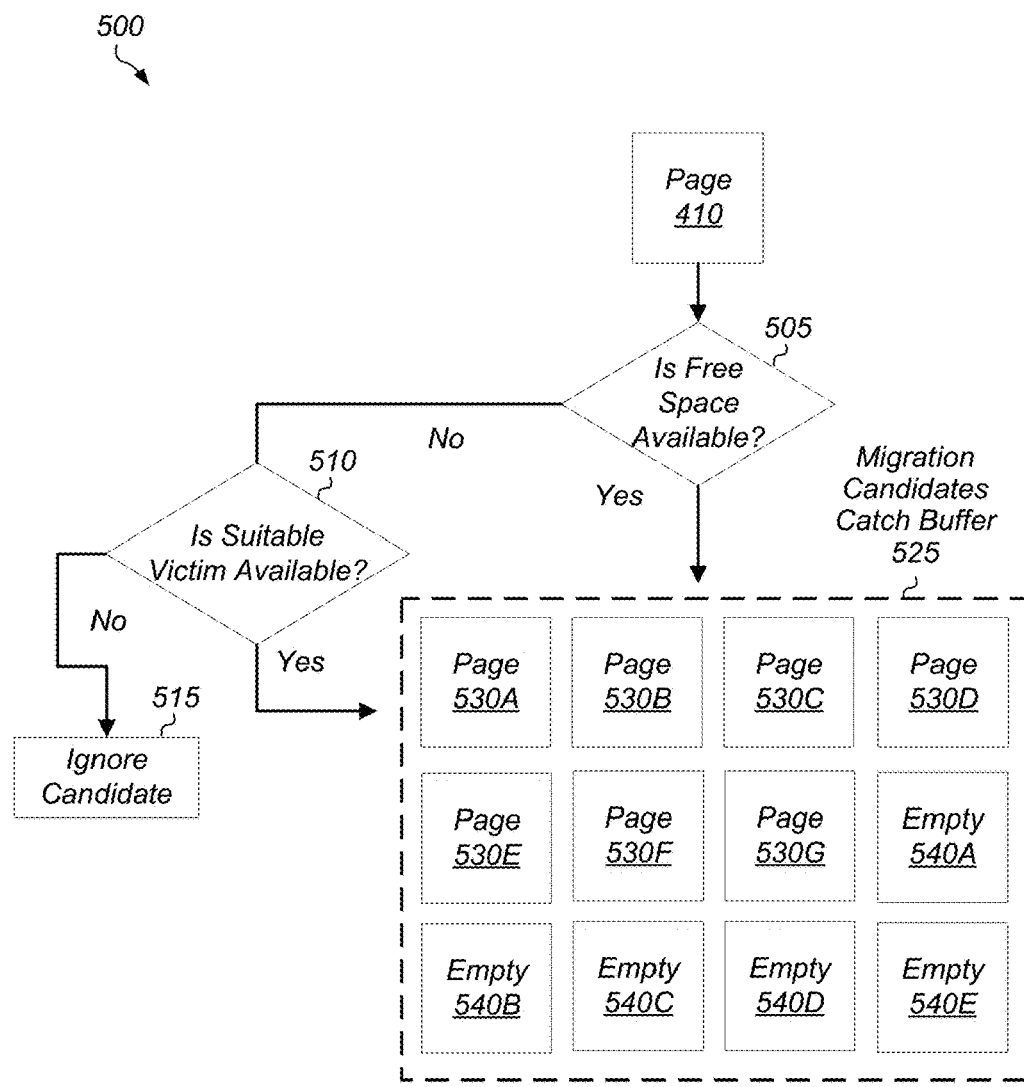
FIG. 5 is a generalized flow diagram illustrating one embodiment of a method for processing a migration candidate.

Referring now to FIG. 5, one embodiment of a method 500 for processing a migration candidate is shown. The discussion of FIG. 5 is intended to be a continuation of the discussion associated with FIG. 4. It is assumed for the purposes of this discussion that virtual page 410 has been identified as a candidate for migration. When virtual page 410 is identified as a candidate for migration, a migration monitor in the driver determines if there is free space available in the local memory (conditional block 505). If the migration module determines there is free space available in the local memory (conditional block 505, "yes" leg), then an entry corresponding to virtual page 410 is added to migration candidates catch buffer 525. Migration candidates catch buffer 525 is utilized to accumulate migration candidates so that a batch of pages can be migrated together at one time rather than performing individual page migrations on a one-by-one basis. In one embodiment, migration candidates catch buffer 525 is flushed on a request log empty signal. In one embodiment, migration candidates catch buffer 525 is kept coherent with pages getting discarded and/or evicted from the local memory.

If the migration module determines there is no free space available in the local memory (conditional block 505, "no" leg), then the migration module determines if there is a suitable victim page available (conditional block 510). If there is a suitable victim page available (conditional block 510, "yes" leg), then virtual page 410 is added to migration candidates catch buffer 525. If a suitable victim page is not available (conditional block 510, "no" leg), then the migration module ignores the migration candidate (block 515). After block 515, method 500 ends.

Figure 6:
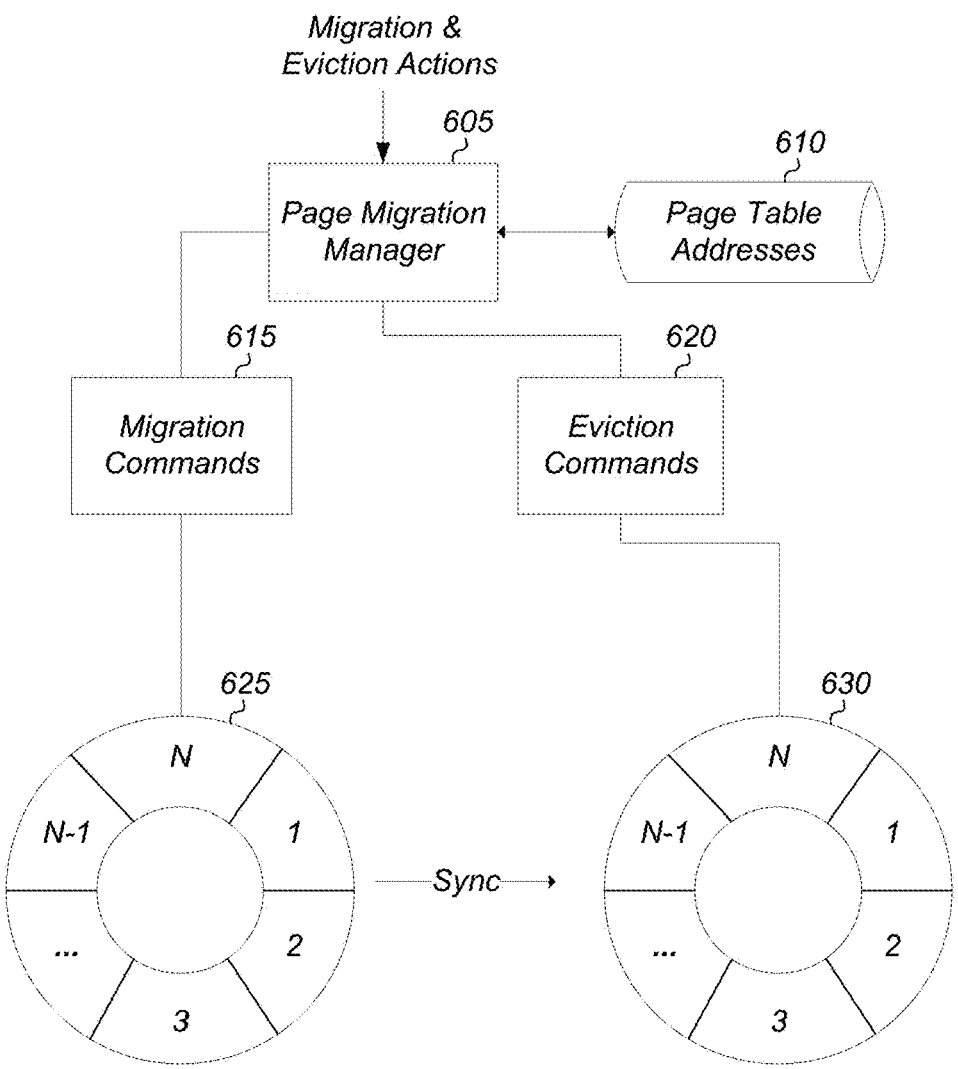
FIG. 6 is a block diagram of one embodiment of a page migration manager.

Turning now to FIG. 6, a block diagram of one embodiment of a page migration manager 605 is shown. In one embodiment, page migration manager 605 is configured to manage a migration candidates catch buffer (e.g., migration candidates catch buffer 525 of FIG. 5). In one embodiment, page migration manager 605 is also configured to manage eviction actions which are initiated by the system. Page migration manager 605 is configured to update the page table addresses 610 of pages which have been migrated from system memory to local memory and of pages which have been evicted from local memory to system memory.

Page migration manager 605 is configured to generate migration commands 615 for pages which are to be migrated from system memory to local memory. Migration commands 615 are stored in buffer 625. In one embodiment, buffer 625 is a ring buffer configured to store up to N migration commands, with N a positive integer which can vary from embodiment to embodiment. Page migration manager 605 is also configured to generate eviction commands 620 for pages which are to be evicted from local memory to system memory. Eviction commands 620 are stored in buffer 630. In one embodiment, buffer 630 is a ring buffer configured to store up to N eviction commands. In one embodiment, page migration manager synchronizes buffer 625 with buffer 630 so that migration and eviction commands are performed together. Accordingly, the location of a page evicted from local memory is utilized to migrate a page from system memory.

Figure 7:
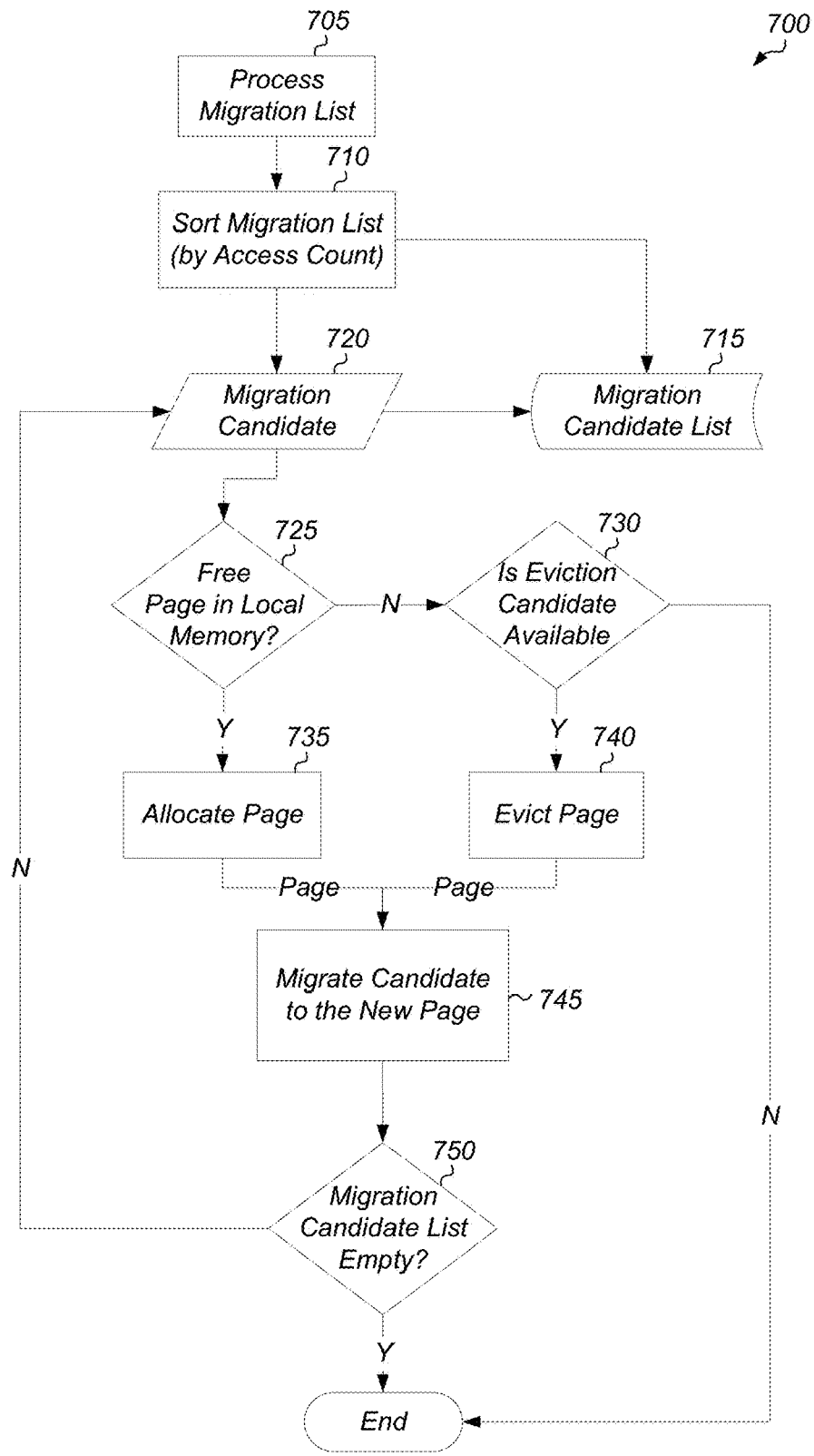
FIG. 7 is a generalized flow diagram illustrating one embodiment of a method for processing a migration list.

Referring now to FIG. 7, one embodiment of a method 700 for processing a migration list is shown. For purposes of discussion, the steps in this embodiment and those of FIGS. 9-12 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A migration list manager processes the migration list (block 705). In one embodiment, the migration list manager is part of the driver, and the migration list includes virtual pages which have been identified as migration candidates by the driver. Before starting the migration, the manager sorts the migration list by access count (block 710). Then, the manager identifies the virtual pages with the highest number of accesses from the top of the migration list, with these most frequently accessed virtual pages representing a migration candidate list (block 715). Then, the manager selects a virtual page as a migration candidate from the migration candidate list (block 720). The manager determines if there is a free page in local memory (conditional block 725). If there is a free page in local memory (conditional block 725, "yes" leg), then the manager allocates a page in the local memory for the selected virtual page (block 735).

If there are no free pages in local memory (conditional block 725, "no" leg), then the manager determines if there is an eviction candidate available (conditional block 730). If there is an eviction candidate available (conditional block 730, "yes" leg), then the manager evicts the page of the eviction candidate from local memory (block 740). Otherwise, if there are no eviction candidates available (conditional block 730, "no" leg), then method 700 ends. If there are no eviction candidates available, the migration candidates remain in the list and can be considered for migration at the next opportunity.

After blocks 735 and 740, the manager migrates the migration candidate to the new page location in local memory (block 745). Then, the manager determines if the migration candidate list is empty (conditional block 750). If the migration candidate list is not empty (conditional block 750, "no" leg), then method 700 returns to block 720. If the migration candidate list is empty (conditional block 750, "yes" leg), then method 700 ends. In one embodiment, method 700 is initiated when either the migration candidate list is full or when the request log is empty. In either case, method 700 is initiated to attempt to migrate the pages identified in the migration candidate list from system memory to local memory.

Figure 8:
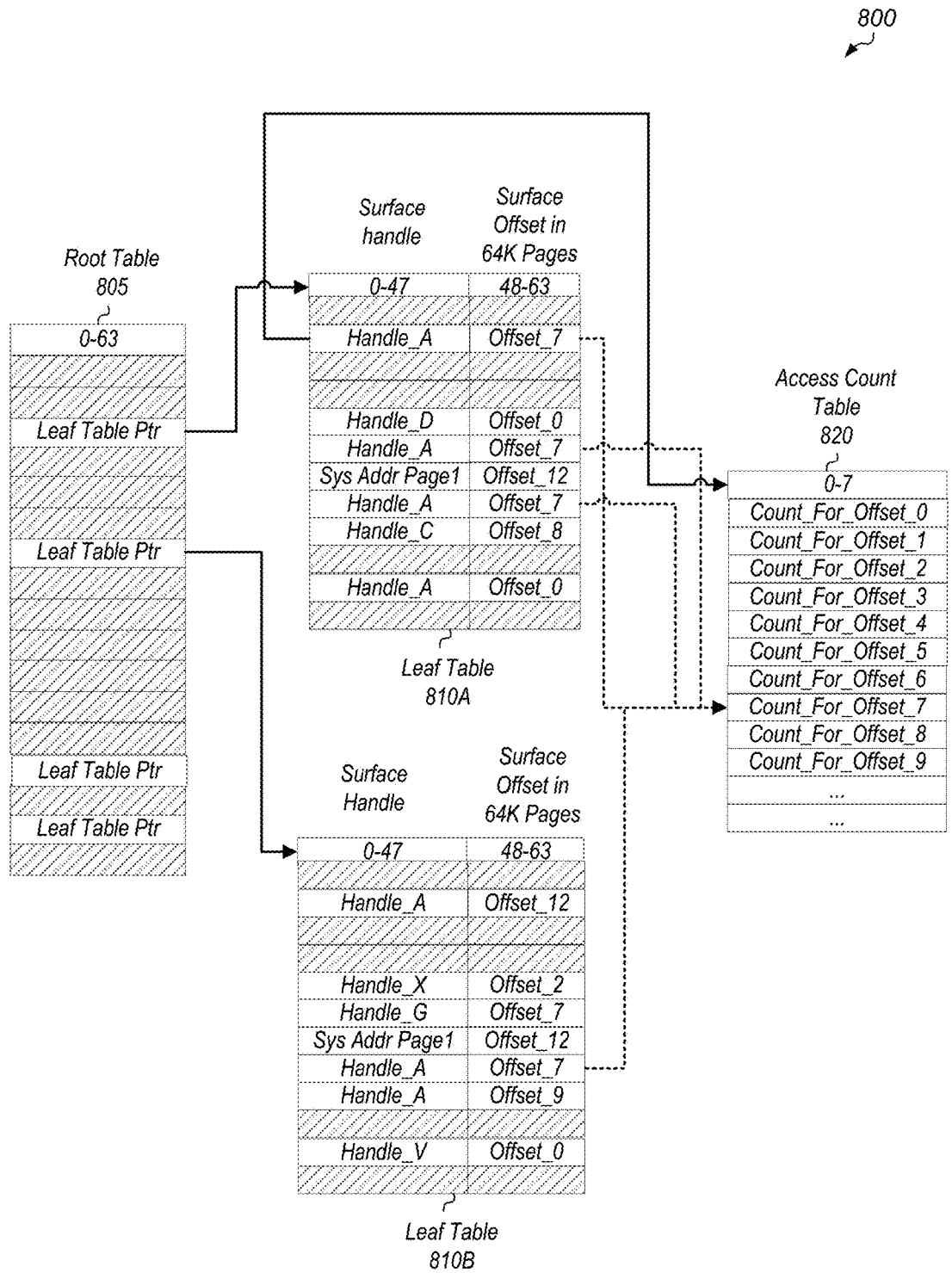
FIG. 8 is a block diagram of one embodiment of a system physical address to GPU virtual address table.

Turning now to FIG. 8, a block diagram of one embodiment of a system physical address to GPU virtual address table 800 is shown. System physical address to GPU virtual address table 800 is configured to store mappings of physical addresses to GPU virtual addresses. In other words, system physical address to GPU virtual address table 800 is a reverse page table which allows a system to determine a virtual address for a physical page based on the physical address of the physical page. System physical address to GPU virtual address table 800 is also configured to maintain access counts for the virtual pages as shown in access count table 820. In one embodiment, table 800 includes a root table level and a leaf table level. In other embodiments, table 800 can include other numbers of levels and/or be structured differently.

An initial lookup of table 800 is performed to root table 805 with a first portion of the physical address of a given physical page. A leaf table pointer will be retrieved from a matching entry of root table 805, with the leaf table pointer pointing to a specific leaf table. Leaf tables 810A-B are representative of any number of leaf tables in system physical address to GPU virtual address table 800. A lookup of a specific leaf table 810A-B is then performed using a second portion of the physical address of the given physical page. The matching leaf table entry will point to an offset within a given access count table 820 for the virtual page containing the given physical page. Access count table 820 is representative of any number of tables for storing access counts for the various virtual pages of a given surface. In one embodiment, each surface includes a separate access count table.

In one embodiment, leaf tables 810A-B include entries which include a surface handle and a surface offset in 64 KB pages. In other embodiments, the virtual pages can be other sizes than 64 KB. The surface handle in each entry points to a specific access count table for the corresponding surface. For example, it is assumed for the purposes of this discussion that access count table 820 stores access counts for pages of surface A, with handle A pointing to access count table 820. The other surface handles point to other access count tables which are not shown in FIG. 8. The offset field of entries in leaf table 810A-B indicates the surface offset in 64 KB pages.

In one embodiment, when a driver processes a request log, the driver retrieves a physical address from an entry of the request log and performs a lookup of table 800 for the physical address. As a result of the lookup of table 800, the driver finds the appropriate entry in an access count table for a corresponding virtual page. Then, the driver increments the access count for this particular virtual page. If the access count is greater than or equal to a threshold, the driver can designate this virtual page as a migration candidate. If the access count is less than the threshold, the driver can continue processing the request log.

Figure 9:
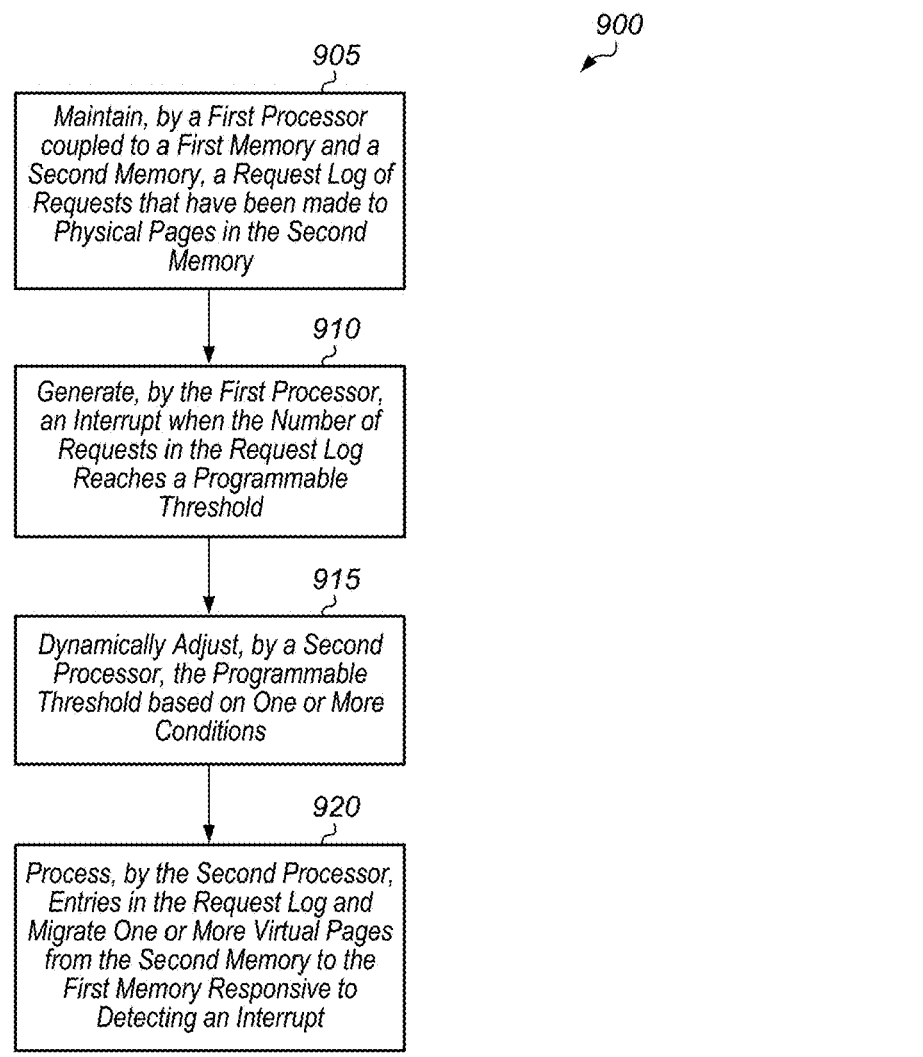
FIG. 9 is a generalized flow diagram illustrating one embodiment of a method for managing the memory of a computing system.

Referring now to FIG. 9, one embodiment of a method 900 for managing the memory of a computing system is shown. A first processor coupled to a first memory and a second memory maintains a request log of requests that have been made to physical pages in the second memory (block 905). The first processor generates an interrupt when the number of requests in the request log reaches a programmable threshold (block 910). A second processor dynamically adjusts the programmable threshold based on one or more conditions (block 915). In one embodiment, the one or more conditions include determining that a rate of interrupt generation is outside of a desired range. In other embodiments, the one or more conditions can include other conditions. The second processor processes entries in the request log and migrates one or more virtual pages from the second memory to the first memory responsive to detecting an interrupt (block 920). After block 920, method 900 ends.

Figure 10:
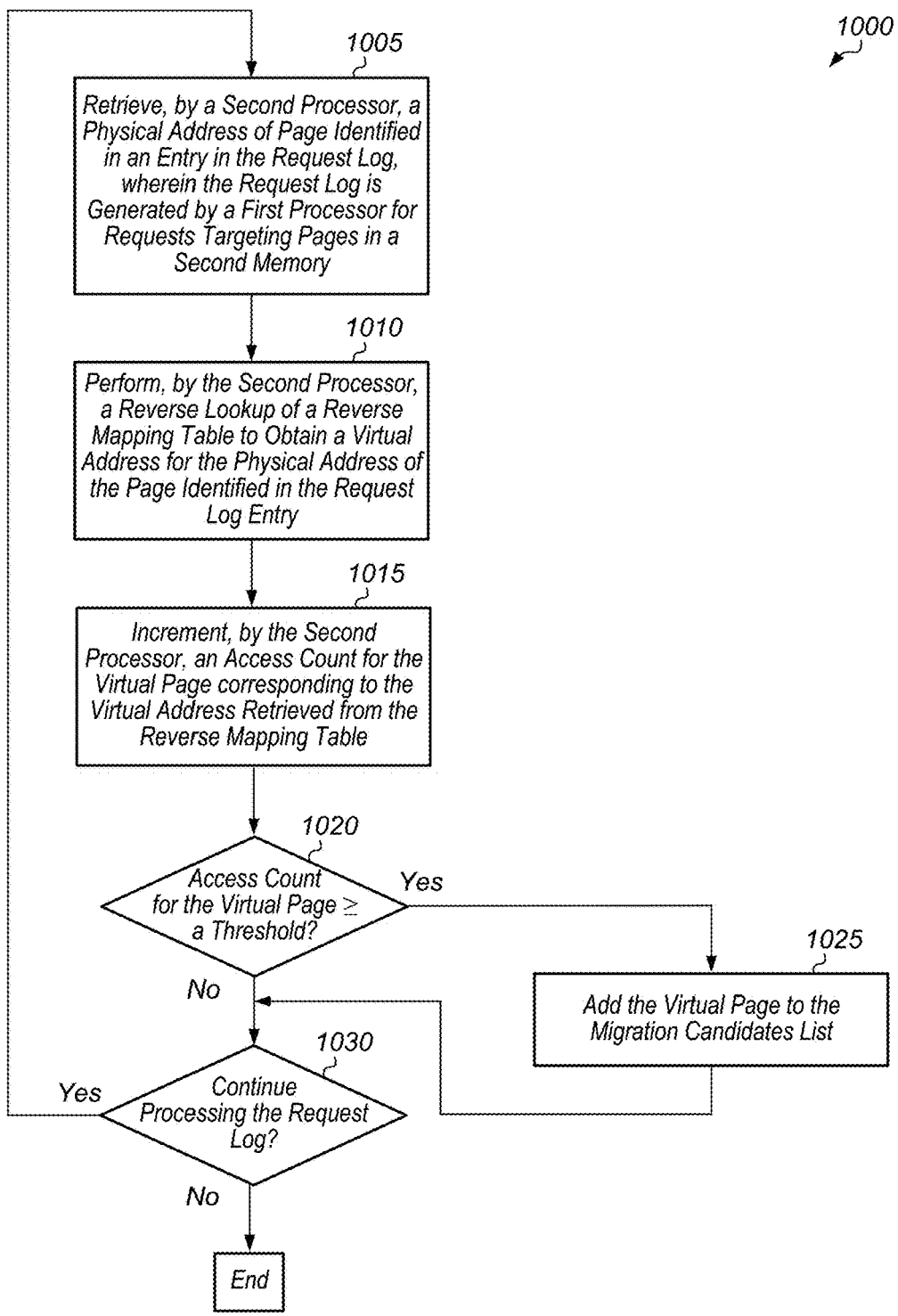
FIG. 10 is a generalized flow diagram illustrating one embodiment of a method for migrating pages from a second memory to a first memory.

Turning now to FIG. 10, one embodiment of a method 1000 for migrating pages from a second memory to a first memory is shown. In one embodiment, method 1000 is performed as the migration portion of block 920 of method 900 (of FIG. 9). A second processor retrieves a physical address of a page identified in an entry in the request log, wherein the request log is generated by a first processor for requests targeting pages in a second memory (block 1005).

Next, the second processor performs a reverse lookup of a reverse mapping table (e.g., table 800 of FIG. 8) to obtain a virtual address for the physical address of the page identified in the request log entry (block 1010). Then, the second processor increments an access count for the virtual page corresponding to the virtual address retrieved from the reverse mapping table (block 1015).

Next, the second processor determines if the access count for the virtual page is greater than or equal to a threshold (conditional block 1020). The threshold can vary from embodiment to embodiment. If the access count for the virtual page is greater than or equal to the threshold (conditional block 1020, "yes" leg), then the second processor adds the virtual page to the migration candidates list (block 1025). It is noted that the migration candidates list stores entries for virtual pages which are candidates for migration from the second memory to a first memory. If the access count for the virtual page is less than a threshold (conditional block 1020, "no" leg), then the second processor determines whether to continue processing the request log (conditional block 1030).

For example, if there are more unprocessed entries in the request log, the second processor can continue processing the request log. Otherwise, if the request log is empty, or an amount of time allotted for processing the request log has expired, the second processor can decide to terminate processing the request log. If the second processor determines to continue processing the request log (conditional block 1030, "yes" leg), then method 1000 returns to block 1005 with the second processor processing the next entry in the request log. If the second processor determines not to continue processing the request log (conditional block 1030, "no" leg), then method 1000 ends.

Figure 11:
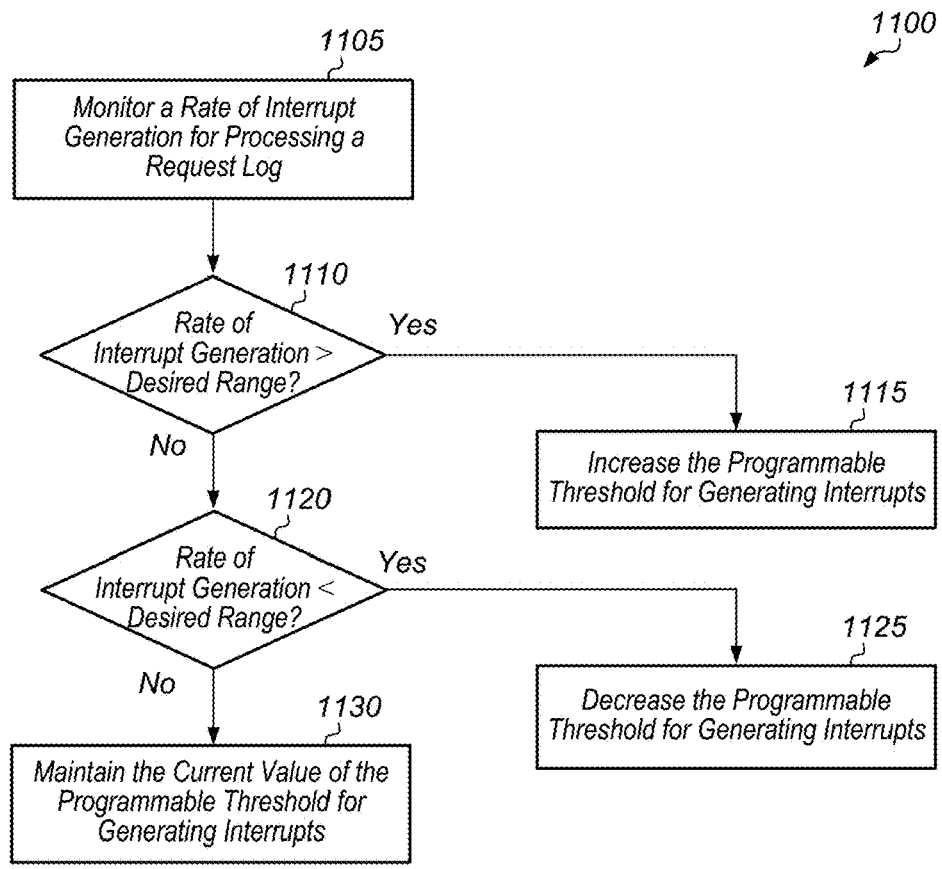
FIG. 11 is a generalized flow diagram illustrating one embodiment of a method for dynamically adjusting a request log programmable threshold for generating interrupts.

Referring now to FIG. 11, one embodiment of a method 1100 for dynamically adjusting a request log programmable threshold for generating interrupts is shown. In one embodiment, method 1100 is implemented as block 915 of method 900 (of FIG. 9). A processor monitors a rate of interrupt generation for processing a request log (block 1105). In one embodiment, the processor is a CPU of a computing system that also includes a GPU. In this embodiment, the GPU generates interrupts for the CPU to process the request log. In other embodiments, the processor can be other types of processors besides CPUs and/or the computing system can include other types of processors. Next, the processor determines if the rate of interrupt generation is greater than a desired range (conditional block 1110). In one embodiment, the desired range is calculated based on generating one interrupt per graphics frame. For example, the desired range can be centered on one interrupt per graphics frame. In other embodiments, the desired range can be calculated based on other factors.

If the rate of interrupt generation is greater than the desired range (conditional block 1110, "yes" leg), then the processor increases the programmable threshold for generating interrupts (block 1115). If the rate of interrupt generation is not greater than the desired range (conditional block 1110, "yes" leg), then the processor determines if the rate of interrupt generation is less than the desired range (conditional block 1120). If the rate of interrupt generation is less than the desired range (conditional block 1120, "yes" leg), then the processor decreases the programmable threshold for generating interrupts (block 1125). If the rate of interrupt generation is not less than the desired range (conditional block 1120, "no" leg), then this indicates that the rate of interrupt generation is within the desired range, and so the processor maintains the current value of the programmable threshold for generating interrupts (block 1130). After blocks 1115, 1125, and 1130, method 1100 ends. It is noted that method 1100 can be performed on a periodic basis by the processor to monitor the rate of interrupt generation and adjust the programmable threshold for generating interrupts so as to keep the rate of interrupt generation within the desired range.

Figure 12:
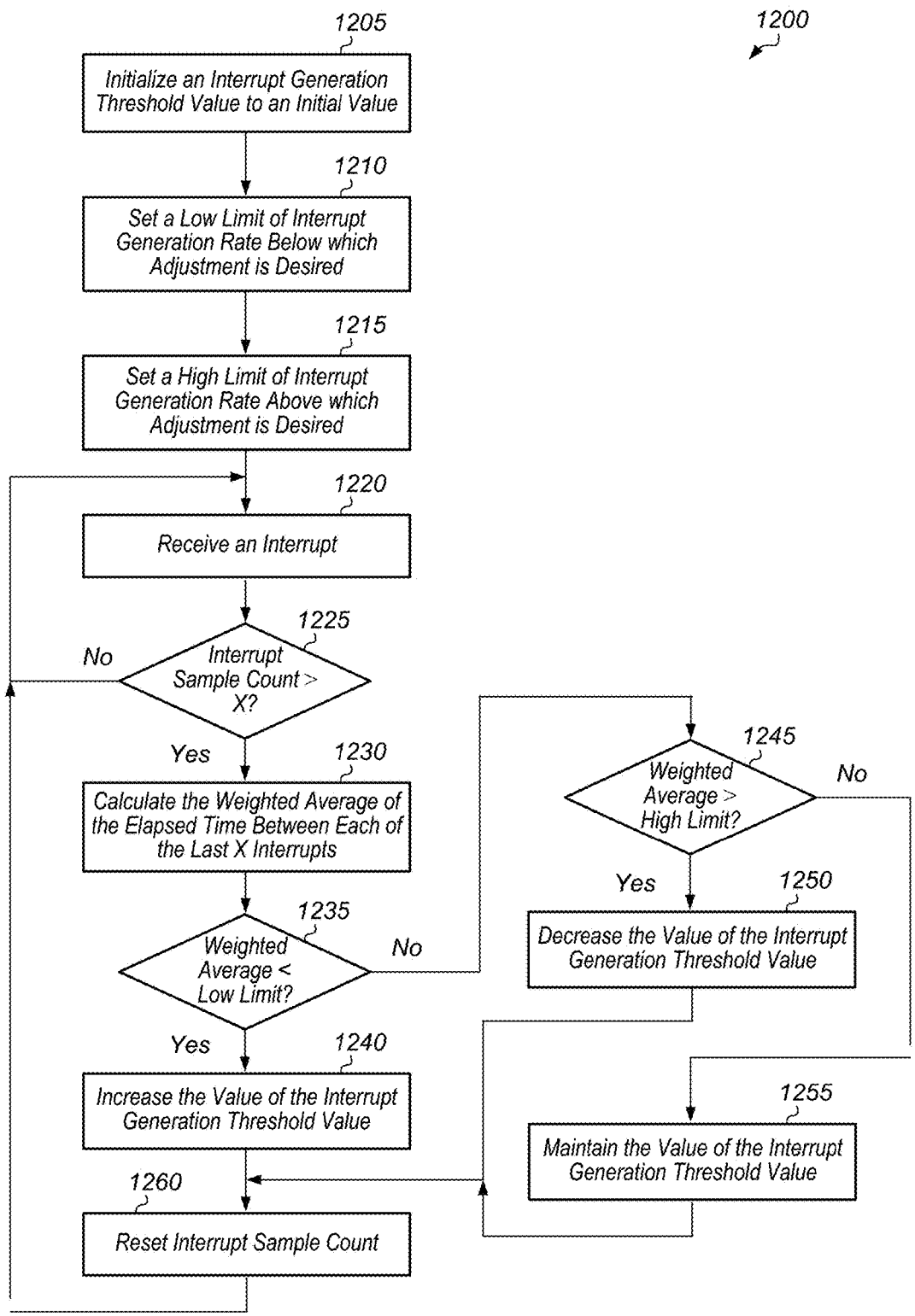
FIG. 12 is a generalized flow diagram illustrating another embodiment of a method for dynamically adjusting the interrupt generation threshold value.

Turning now to FIG. 12, another embodiment of a method 1200 for dynamically adjusting the interrupt generation threshold value is shown. In one embodiment, method 1200 is implemented as block 915 of method 900 (of FIG. 9). A processor initializes the interrupt generation threshold value to an initial value (block 1205). In one embodiment, the processor is a CPU. In other embodiments, the processor is any of various other types of processors. Next, the processor sets a low limit of interrupt generation rate below which adjustment is desired (block 1210). Also, the processor sets a high limit of interrupt generation rate above which adjustment is desired (block 1215). Next, the processor receives an interrupt (block 1220). In one embodiment, the interrupt is generated by a GPU. In other embodiments, the interrupt can be generated by other types of processors or other types of components.

Next, the processor determines if the interrupt sample count is greater than a value X, wherein X is a positive integer (conditional block 1225). It is noted that the value of X can vary from embodiment to embodiment. For example, in one embodiment, X is equal to eight. If the interrupt sample count is greater than X (conditional block 1225, "yes" leg), then the processor calculates the weighted average of the elapsed time between each of the last X interrupts (block 1230). In one embodiment, the average is weighted to prioritize the more recent interrupts. For example, the oldest sample has the lowest weight and the most recent sample has the highest weight.

Next, the processor determines if the weighted average is less than the low limit of interrupt generation rate (conditional block 1235). If the weighted average is less than the low limit (conditional block 1235, "yes" leg), then the processor increases the value of the interrupt generation threshold value (block 1240). If the weighted average is greater than or equal to the low limit (conditional block 1235, "no" leg), then the processor determines if the weighted average is greater than the high limit of interrupt generation rate (conditional block 1245).

If the weighted average is greater than the high limit (conditional block 1245, "yes" leg), then the processor decreases the value of the interrupt generation threshold value (block 1250). If the weighted average is less than or equal to the high limit (conditional block 1245, "no" leg), then the processor maintains the value of the interrupt generation threshold value (block 1255). After blocks 1240, 1250, and 1255, the processor resets the interrupt sample count (block 1260). After block 1260, method 1200 returns to block 1220.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a first processor and a second processor; and
   a first memory and a second memory;
   wherein the first processor is configured to:
      maintain a request log of entries identifying requests that have been made to pages stored in the second memory;
      generate an indication for the second processor to process the request log when the number of entries in the request log reaches a first threshold;
   wherein the second processor is configured to:
      increase the first threshold responsive to determining a rate of indication generation is greater than a given range; and
      decrease the first threshold responsive to determining the rate of indication generation is less than the given range;
      process the request log responsive to detecting the indication; and
      determine whether to migrate physical pages from the second memory to the first memory.

2. The system as recited in claim 1, wherein the given range is based on generating one indication per graphics frame.

3. The system as recited in claim 1, wherein processing the request log comprises:
   retrieving a physical addresses of a physical page identified in an entry in the request log;
   determining a virtual page which maps to the physical page;
   updating an access count associated with the virtual page; and
   migrating a plurality of physical pages, of the virtual page, from the second memory to the first memory responsive to determining the access count is greater than a second threshold.

4. The system as recited in claim 3, wherein processing the request log further comprises:
   performing a reverse lookup of a reverse mapping table to retrieve a virtual address of the virtual page which maps to the physical page identified in the entry of the request log; and
   updating page table entries for the plurality of physical pages which are migrated.

5. The system as recited in claim 1, wherein:
   the first processor is a graphics processing unit (GPU);
   the second processor is a central processing unit (CPU); and
   the indication is an interrupt.

6. A method comprising:
   maintaining, by a first processor, a request log of with entries identifying requests that have been made to pages stored in a second memory;
   generating, by the first processor, an indication for a second processor to process the request log when the number of entries in the request log reaches a first threshold;

increasing the first threshold responsive to determining a rate of indication generation is greater than a given range; and decrease the first threshold responsive to determining the rate of indication generation is less than the given range processing, by the second processor, the request log responsive to detecting the indication; and determining, by the second processor, whether to migrate physical pages from the second memory to a first memory.

7. The method as recited in claim 6, wherein the given range is based on generating one indication per graphics frame.

8. The method as recited in claim 6, wherein processing the request log comprises:

retrieving a physical addresses of a physical page identified in an entry in the request log;

determining a virtual page which maps to the physical page;

updating an access count associated with the virtual page; and migrating a plurality of physical pages, of the virtual page, from the second memory to the first memory responsive to determining the access count is greater than a second threshold.

9. The method as recited in claim 8, wherein processing the request log further comprises:

performing a reverse lookup of a reverse mapping table to retrieve a virtual address of the virtual page which maps to the physical page identified in the entry of the request log; and updating page table entries for the plurality of physical pages which are migrated.

10. The method as recited in claim 6, wherein:

the first processor is a graphics processing unit (GPU);

the second processor is a central processing unit (CPU); and the indication is an interrupt.

11. An apparatus comprising:

a graphics processing unit (GPU);

a central processing unit (CPU);

a first memory; and a second memory;

wherein the GPU is configured to:

maintain a request log of with entries identifying requests that have been made to pages stored in the second memory;

generate an indication for the second processor to process the request log when the number of entries in the request log reaches a first threshold;

wherein the CPU is configured to:

increase the first threshold responsive to determining a rate of indication generation is greater than a given range; and decrease the first threshold responsive to determining the rate of indication generation is less than the given range;

process the request log responsive to detecting the indication; and determine whether to migrate physical pages from the second memory to the first memory.

12. The apparatus as recited in claim 11, wherein the given range is based on generating one indication per graphics frame.

13. The apparatus as recited in claim 11, wherein processing the request log comprises:

retrieving a physical addresses of a physical page identified in an entry in the request log;

determining a virtual page which maps to the physical page;

updating an access count associated with the virtual page; and migrating a plurality of physical pages, of the virtual page, from the second memory to the first memory responsive to determining the access count is greater than a second threshold.

14. The apparatus as recited in claim 13, wherein processing the request log further comprises:

performing a reverse lookup of a reverse mapping table to retrieve a virtual address of the virtual page which maps to the physical page identified in the entry of the request log; and updating page table entries for the plurality of physical pages which are migrated.

* * * * *